May 17, 1966  R. C. FISHER  3,251,627
SEAT BELT RETRACTOR
Filed July 29, 1963  2 Sheets-Sheet 1
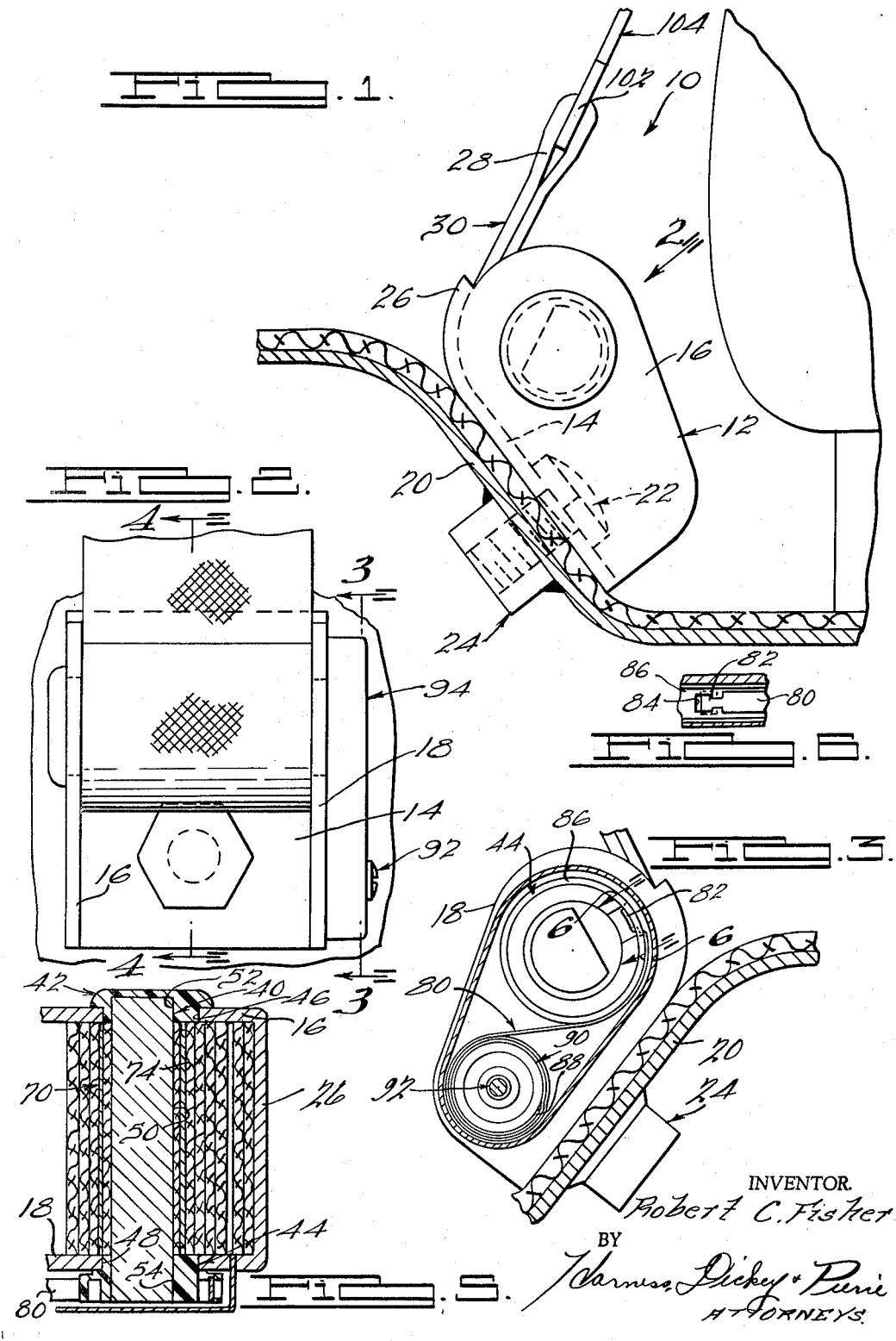
INVENTOR.
Robert C. Fisher
BY
Harness, Dickey & Pierce
ATTORNEYS May 17, 1966  R. C. FISHER  3,251,627
SEAT BELT RETRACTOR
Filed July 29, 1963  2 Sheets-Sheet 2
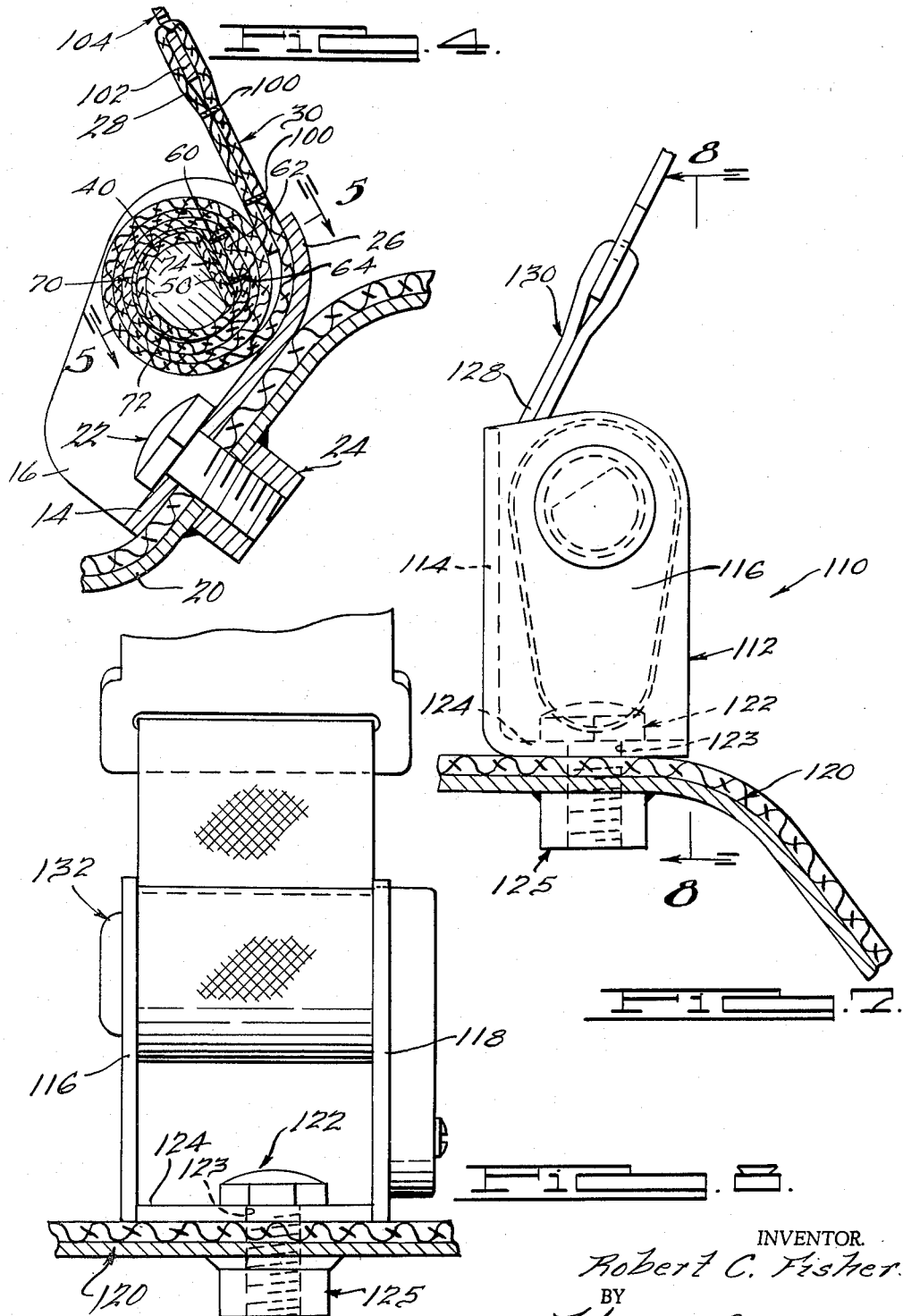
INVENTOR.
Robert C. Fisher.
BY
Harness, Dickey & Pierce.
ATTORNEYS

United States Patent Office 3,251,627
Patented May 17, 1966

3,251,627
SEAT BELT RETRACTOR
Robert C. Fisher, 580 E. Long Lake Road,
Bloomfield Hills, Mich.
Filed July 29, 1963, Ser. No. 298,319
1 Claim. (Cl. 297—388)

This invention relates generally to automotive type seat belts and more particularly to a retractor for an automotive type seat belt.

The widespread acceptance of safety seat belts in automobiles has created the need for an improved seat belt retractor for the end of the belt adjacent the vehicle door. In vehicles not having such a seat belt retractor, the end portion of the belt adjacent the door often falls out of the vehicle when the door is opened, requiring that it be replaced on the vehicle seat or adjacent floor panel prior to closure of the door. When the free end portion of the belt has a metal component attached thereto, for example a metal tongue, the situation is aggravated since the tongue may become jammed between the door and the door frame, resulting in damage thereto, abrasion of the seat belt, or jamming of the door.

In accordance with the instant invention, the outboard end portion of an automobile seat belt is secured to an improved retractor mechanism that effects retraction thereof when the opposite end portions of the belt are uncoupled. Retraction is effected by a relatively small and compact mechanism that is extremely rugged in construction so as to be capable of withstanding the repeated operation and relatively severe loads that must be sustained by automotive type seat belts.

It is desirable for the free end of a seat belt, having a tongue or other latching hardware thereon, to be orientated so as to be relatively easily grasped by the vehicle occupant. This is particularly important since the interior lights of an automotive vehicle often do not light up the floor areas of the vehicle adjacent the seats.

In accordance with the instant invention, a seat belt retractor effects orientation of the free end of the seat belt so that it is easily grasped by the vehicle occupant.

Accordingly, one object of the instant invention is an improved seat belt retractor.

Another object is a seat belt retractor that orientates the end portion of the belt for easy access.

Other objects and advantages of the instant invention will be apparent from the following specification, claims and drawings, wherein:

FIGURE 1 is a side elevational view of a seat belt retractor mounted on the floor panel of an automobile;

FIG. 2 is a view taken in the direction of the arrow 2 of FIGURE 1;

FIG. 3 is a view taken substantially along the line 3—3 of FIGURE 2;

FIG. 4 is a cross-sectional view taken substantially along the line 4—4 of FIGURE 2;

FIG. 5 is a cross-sectional view taken substantially along the line 5—5 of FIGURE 4;

FIG. 6 is a cross-sectional view taken substantially along the line 6—6 of FIGURE 3;

FIG. 7 is a side elevational view, similar to FIGURE 1, of a modified seat belt retractor; and FIG. 8 is a view taken substantially along the line 8—8 of FIGURE 7.

A seat belt retractor 10, in accordance with an exemplary constructed embodiment of the instant invention, comprises a generally U-shaped frame 12 defined by a bight portion 14 and opposite leg portions 16 and 18. The frame 12 is adapted to be secured to a floor panel 20 of an automobile as by a machine screw 22. The machine screw 22 is accepted in a complementary nut 24 that is secured to the underside of the automobile floor panel 20 as by welding. It is to be noted that the bight portion 14 of the retractor frame 12 has a curved upper end portion 26, as seen in FIGURE 1 of the drawing, to orientate an end portion 28 of a seat belt 30 as will be more particularly described hereinafter.

As best seen in FIGURE 5, a belt support shaft 40 made from, for example, cold rolled steel, is supported in a pair of axially spaced, molded, nylon bearing caps 42 and 44. The bearing caps 42 and 44 are rotatably accepted in complementary apertures 46 and 48 in the leg portions 16 and 18 of the retractor frame 12.

It is to be noted that, as best seen in FIGURE 4 of the drawings, the shaft 40 is provided with a flat surface 50, the bearings 42 and 44 having recesses 52 and 54 complementary to the transverse cross-section of the shaft 40 so as to accept shaft 40 in torque transmitting relation.

As best seen in FIGURE 4 of the drawings, an inner end portion 60 of the belt 30 is looped about the shaft 40 and then stitched to an adjacent portion 62 of the belt 30, as by stitches 64. Thus, when the belt 30 is fully unwound, load on the belt 30 is transferred through the loop to the shaft 40, through the bearings 42 and 44 to the retractor frame 12, thence to the floor panel 20 of the automobile.

In order to effect retraction of the belt, relative rotation between the end portion 60 thereof and the shaft 40 must be precluded. In accordance with one feature of the instant invention, such relative rotation is precluded by an elongated clip 70 of generally horseshoe-shaped cross-section made from, for example, spring steel. Opposite edge portions 72 and 74 of the clip 70 envelop the loop portions 60 and 62 of the belt 30 as well as the shaft 40, the edge portion 74 of the clip 70 being flat so as to be complementary to the flat 50 on the shaft 40 and effect a driving relation between the belt 30 and the shaft 40.

As best seen in FIGURE 3 of the drawings, rotation of the shaft 40 and retraction of the belt 30 is effected by a spring 80, for example, one such as sold under the trademark "Neg'ators," having one end portion 82 of T-shaped cross-section that is accepted in a complementary aperture 84 (FIG. 6) in an annular flange 86 on the bearing cap 44. An opposite end portion 88 of the spring 80 is wound about a complementary rotatable stud shaft 90 that is journaled on a machine screw 92. The screw 92 serves the dual functions of retaining a cover plate 94 for the spring 80 in position on the leg portion 18 of the frame 12 and journaling of the stud shaft 90. The spring 80 is unwound from the stud shaft 90 and wound upon the bearing cap 44 when the belt 30 is pulled to the operative condition by the user. It is to be noted that the spring 80 exerts a smooth relatively constant and light torque on the shaft 40 tending to wind up the belt 30.

As best seen in FIGURE 4 of the drawings, the end portion 26 of the bight 14 of the frame 12 is folded arcuately upwardly to orientate the end portion 28 of the belt 30 and tongue 104 generally vertically. The end portion 28 of the belt 30 comprises a loop that is secured together by stitches 100 so as to relatively rigidly retain an end portion 102 of a belt tongue 104. Thus, in accordance with another feature of the instant invention, the double thickness of the end portion 28 of the belt 30 is utilized as a stop that is caught between the end portion 26 of the frame 12 and the bulk of the belt 30 that is wound on the shaft 40. In other words, the space relationship between the coiled diameter of the belt 30, the thickness of the end portion 28 thereof, and the position of the end portion 26 on the frame 12 is utilized to position and orientate the tongue 104.

As seen in FIGURES 7 and 8, and in accordance with another embodiment of the instant invention, a seat belt retractor 110 comprises a generally U-shaped frame 112 defined by a bight portion 114 and opposite leg portions 116 and 118. The frame 112 is adapted to be secured to a floor panel 120 of an automobile as by a machine screw 122. The machine screw 122 extends through a complementary aperture 123 in a base portion 124 of the frame 112, the base portion 124 extending generally normally to the bight portion 114 thereof. The screw 122 is accepted in a complementary nut 125 that is secured to the underside of the automobile floor panel 120 as by welding.

It is to be noted that the bight portion 114 of the retractor frame 112 extends generally vertically, as seen in FIGURE 7 of the drawing, to vertically orientate an end portion 128 of a seat belt 130 as discussed hereinbefore. In other words, the end portion 128 of the belt 130 is pinched between the bight 114 of the frame 112 and the portion of the belt 130 previously coiled. In all other respects the belt retractor 110 is similar to the retractor 10 discussed hereinbefore.

It is to be understood that the specific constructions of the seat belt retractors herein disclosed and described are presented for the purpose of explanation and illustration and are not intended to indicate limits of the invention, the scope of which is defined by the following claim.

What is claimed is:

A seat belt retractor comprising a generally U-shaped frame defined by a bight portion and spaced leg portions,
  a rotatable belt takeup shaft journaled in the leg portions of said frame,
  the bight portion of said frame having an upper end portion extending generally vertically in predetermined spaced relation to said takeup shaft,
  means for securing said frame to a floor panel of an automobile,
  an extendable seat belt normally coiled on said takeup shaft having an enlarged free end portion, and
  means for rotating said takeup shaft to wind said belt thereupon, the upper end of the bight portion of said frame being horizontally spaced from said takeup shaft so that the enlarged end portion of said belt is caught between the upper end of said frame and the coiled portion of said belt when said belt is substantially entirely coiled on said takeup shaft thereby to limit retraction of said belt and orientate the free end portion of said belt generally vertically to facilitate access thereto.

References Cited by the Examiner

UNITED STATES PATENTS

| | | | |
|---|---|---|---|
| 681,719 | 9/1901 | Merk | 242—74 |
| 856,254 | 6/1907 | Helmond | 242—74 |
| 1,534,755 | 4/1925 | Abbott | 242—74 |
| 2,963,080 | 12/1960 | Zang | 297—388 |
| 3,021,085 | 2/1962 | Freer | 242—74 |
| 3,074,761 | 1/1963 | Ryan | 297—388 |
| 3,137,526 | 6/1964 | Carreberg | 297—388 |

FRANK B. SHERRY, *Primary Examiner.*

J. S. PETRIE, R. B. FARLEY, *Assistant Examiners.*